US012730256B2

(12) United States Patent
Godet et al.

(10) Patent No.: US 12,730,256 B2
(45) Date of Patent: Sep. 8, 2026

(54) METHODS TO REDUCE OPTICAL LOSS OF AN AR WAVEGUIDE

(71) Applicant: Applied Materials, Inc., Santa Clara, CA (US)

(72) Inventors: Ludovic Godet, Sunnyvale, CA (US); Jinxin Fu, Fremont, CA (US)

(73) Assignee: Applied Materials, Inc., Santa Clara, CA (US)

( * ) Notice: Subject to any disclaimer, the term of this patent is extended or adjusted under 35 U.S.C. 154(b) by 230 days.

(21) Appl. No.: 18/495,409

(22) Filed: Oct. 26, 2023

(65) Prior Publication Data

US 2024/0142693 A1 May 2, 2024

Related U.S. Application Data

(60) Provisional application No. 63/420,124, filed on Oct. 28, 2022.

(51) Int. Cl.
*F21V 8/00* (2006.01)
*G02B 5/18* (2006.01)

(52) U.S. Cl.
CPC ......... *G02B 6/0065* (2013.01); *G02B 5/1852* (2013.01)

(58) Field of Classification Search
CPC .................................................... G02B 5/1852
See application file for complete search history.

(56) References Cited

U.S. PATENT DOCUMENTS 5,178,658 A 1/1993 Tumminelli et al.
6,825,101 B1 11/2004 Hawryluk et al.
9,257,562 B2 2/2016 Shimomura et al.
2003/0133637 A1 7/2003 Bao et al.
2004/0240821 A1* 12/2004 Vernon .................. G02B 6/132 385/130
2016/0327743 A1 11/2016 Kippenberg et al.
(Continued)

FOREIGN PATENT DOCUMENTS

JP H10135182 A 5/1998
JP H10256236 A 9/1998
(Continued)

OTHER PUBLICATIONS

International Search Report and Written Opinion dated Feb. 19, 2024 for Application No. PCT/US2023/036033.
(Continued)

*Primary Examiner* — Sung H Pak

(74) *Attorney, Agent, or Firm* — Patterson + Sheridan, LLP

(57) ABSTRACT

Methods for modifying the interface of optical substrates. To achieve desirable optical properties, surface defects need to be removed from the interface layer. In one example, a substrate is exposed to an ion beam then a high temperature bake or laser annealing to correct the interface layer. In another example, a high energy ion beam can be used to remove the interface layer then a new interface layer can be added during a high temperature bake or laser annealing with a protective layer added last. If not removed surface defects in the interface layer may absorb a percentage of light in a single interaction. In a waveguide, light may bounce ten to hundreds of times inside a substrate causing significant light loss. Therefore, removing the surface defects significantly increases waveguide efficiency.

19 Claims, 3 Drawing Sheets

(56) References Cited

U.S. PATENT DOCUMENTS

| | | | |
|---|---|---|---|
| 2018/0348429 A1 | 12/2018 | Young et al. | |
| 2022/0025518 A1 | 1/2022 | Ceballos et al. | |
| 2022/0316044 A1 | 10/2022 | Ohno et al. | |
| 2022/0344476 A1 * | 10/2022 | Chan ........................ | H10D 8/50 |

FOREIGN PATENT DOCUMENTS

| | | |
|---|---|---|
| JP | 2001194694 A | 7/2001 |
| JP | 2003215379 A | 7/2003 |
| JP | 2004258442 A | 9/2004 |
| JP | 2022524333 A | 5/2022 |
| WO | 2021225771 A1 | 11/2021 |
| WO | 2021247287 A1 | 12/2021 |

OTHER PUBLICATIONS

Office Action from South Korean Patent Application No. 10-2025-7016901, dated Jul. 6, 2026, 14 pages.

Japanese Office Action dated Jul. 7, 2026 for Application No. 2025-523548, 6 pages.

* cited by examiner

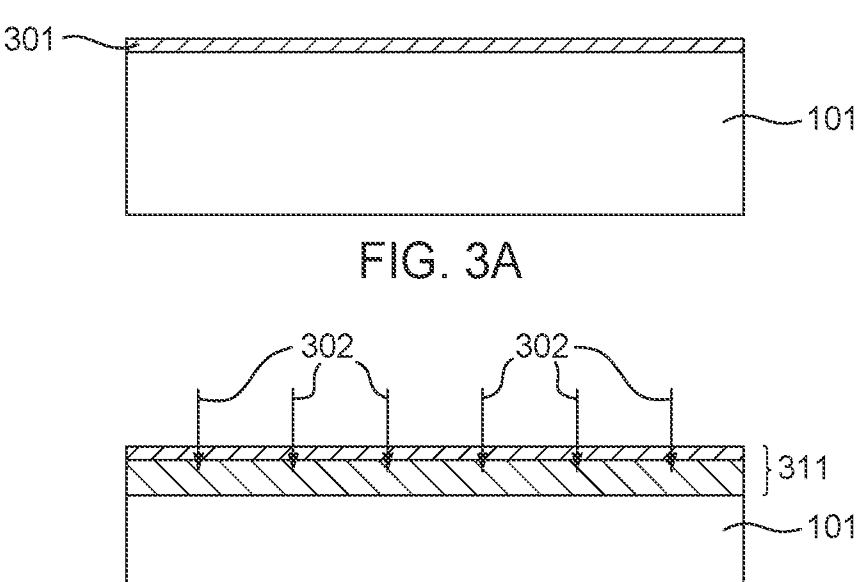
FIG. 3A
FIG. 3B
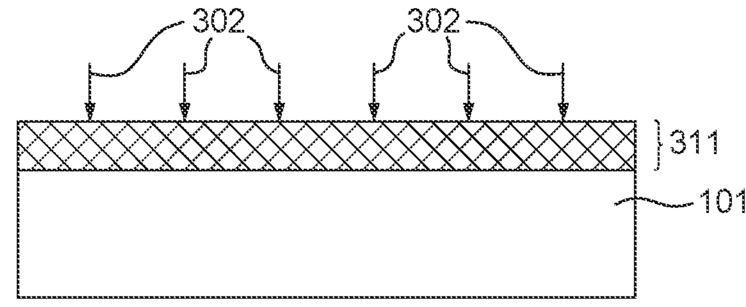
FIG. 3C
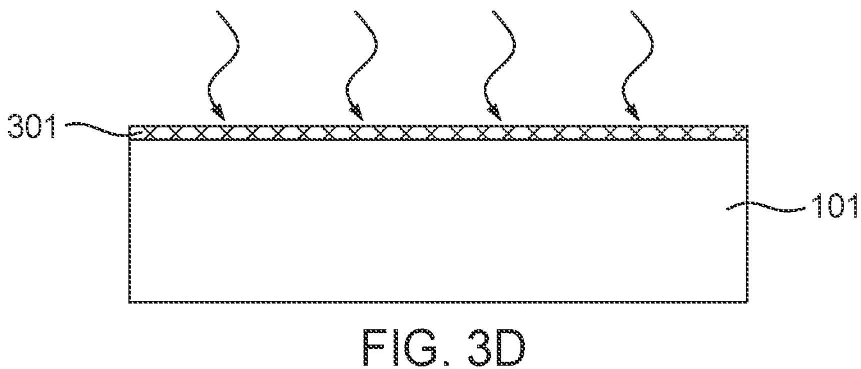
FIG. 3D

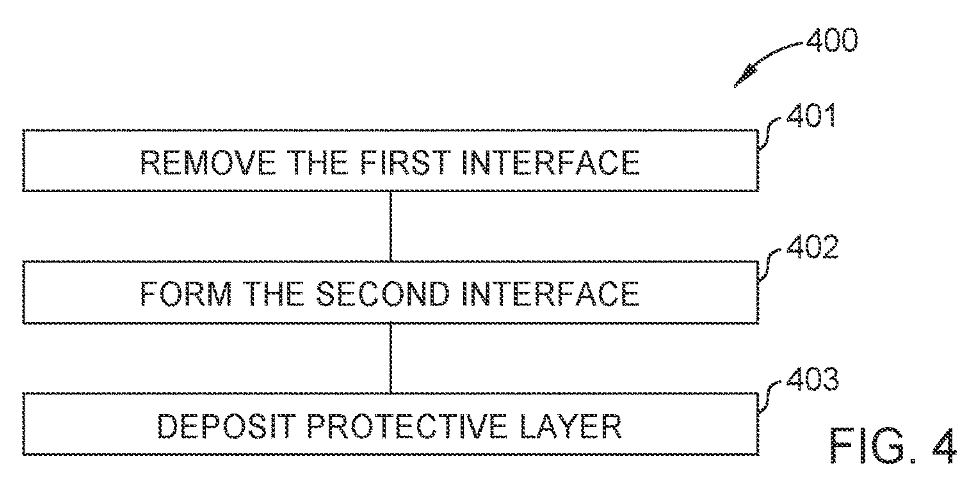
FIG. 4
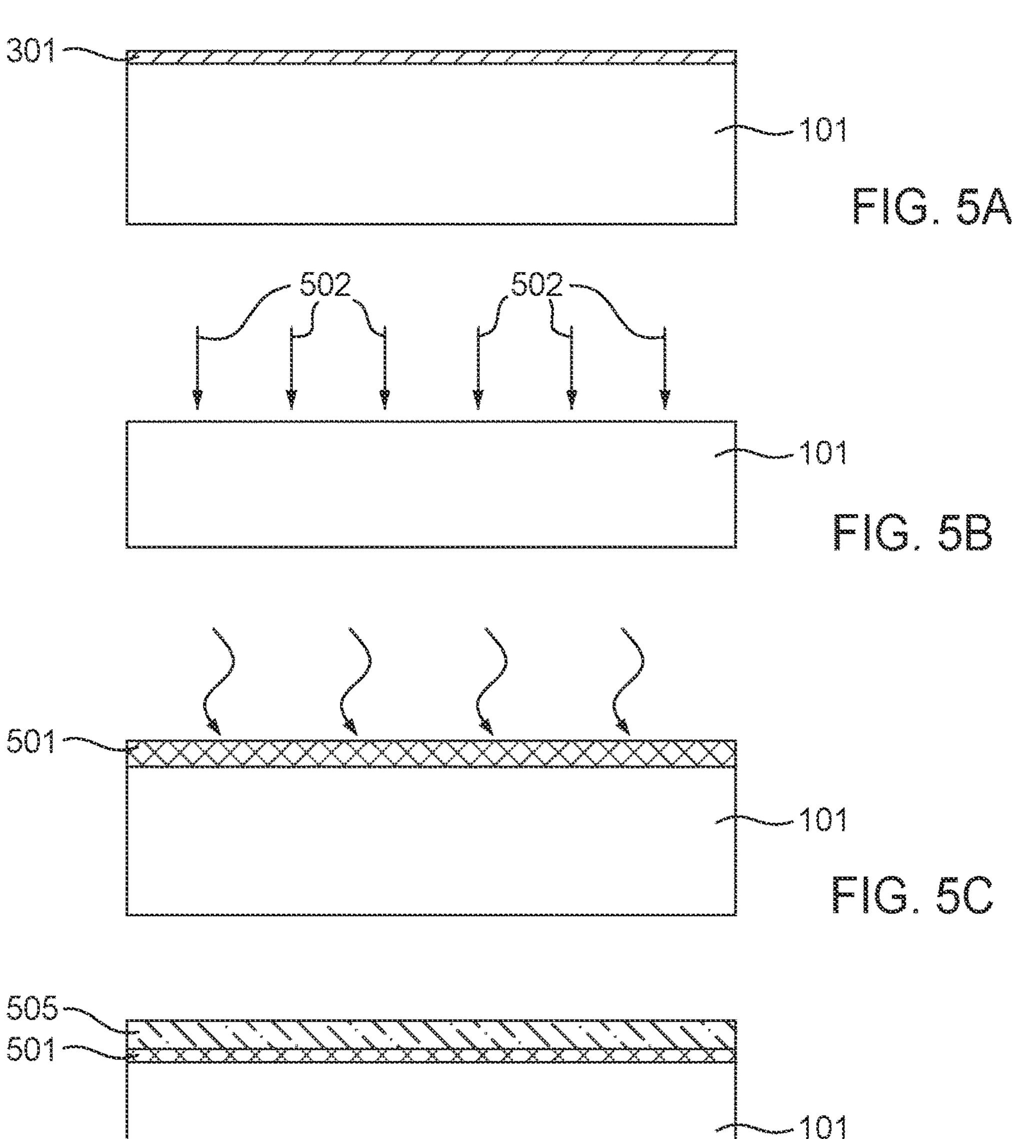
FIG. 5A
FIG. 5B
FIG. 5C
FIG. 5D

METHODS TO REDUCE OPTICAL LOSS OF AN AR WAVEGUIDE

CROSS-REFERENCE TO RELATED APPLICATIONS

This application claims priority to U.S. Provisional Patent Application Ser. No. 63/420,124, filed on Oct. 28, 2022, which is herein incorporated by reference.

BACKGROUND

Field

Embodiments of the present disclosure generally relate to optical devices. More specifically, embodiments described herein relate to methods of modifying the interface of a waveguide or an optical device substrate.

Description of the Related Art

Virtual reality is generally considered to be a computer generated simulated environment in which a user has an apparent physical presence. A virtual reality experience can be generated in 3D and viewed with a head-mounted display (HMD), such as glasses or other wearable display devices that have near-eye display panels as lenses to display a virtual reality environment that replaces an actual environment.

Augmented reality (AR), however, enables an experience in which a user can still see through the display lenses of the glasses or other HMD device to view the surrounding environment, yet also see images of virtual objects that are generated for display and appear as part of the environment. Augmented reality can include any type of input, such as audio and haptic inputs, as well as virtual images, graphics, and video that enhances or augments the environment that the user experiences.

One such challenge is displaying a virtual image overlaid on an ambient environment. Waveguides, such as augmented reality waveguides are used to assist in overlaying images. Generated light is propagated through an optical device until the light exits the waveguide and is overlaid on the ambient environment. It is desirable for waveguides to be to be modified to reduce optical loss of the waveguides or optical device substrates of the waveguides. Accordingly what is a need in the art are methods of modifying the interface of a waveguide or an optical device substrate.

SUMMARY

In one embodiment, a method of fabricating a waveguide is provided. The method includes exposing a first interface layer of an optical device substrate to an ion beam. The optical device substrate comprising silicon carbide (SiC) containing materials, lithium niobate ($LiNbO_3$) containing materials, diamond (C) containing materials, metal oxide containing materials, or combinations thereof, and the first interface layer is disposed on a first surface of the optical device substrate. The method further includes subjecting the optical device substrate to a bake process or an anneal process. The bake process or the anneal process recrystallizes the first interface layer, removes impurities from the first interface layer, or forms a second interface layer on the first surface of the optical device substrate.

In another embodiment, a method of fabricating a waveguide is provided. The method includes removing a first interface layer of an optical device substrate. The optical device substrate comprising silicon carbide (SiC) containing materials, lithium niobate ($LiNbO_3$) containing materials, diamond (C) containing materials, metal oxide containing materials, or combinations thereof, and the first interface layer is disposed on a first surface of the optical device substrate. The method further includes forming a second interface layer using a bake process or an anneal process, and depositing a protective layer on the second interface layer.

In another embodiment, a waveguide is provided. The waveguide includes an optical device substrate having a substrate material and an interface layer. The substrate material includes silicon carbide (SiC) containing materials, lithium niobate ($LiNbO_3$) containing materials, diamond (C) containing materials, metal oxide containing materials, or combinations thereof. The interface layer is disposed on the optical device substrate and includes the substrate material and a dopant material. The waveguide further includes at least one grating having optical device structures disposed in the interface layer.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

FIGS. 3A-3D are schematic, cross-sectional views of a substrate during a method of modifying the interface of the substrate according to the embodiments.

FIG. 4 is a flow diagram of a method for modifying the interface of the substrate according to embodiments.

FIGS. 5A-5D are schematic, cross-sectional views of a substrate during a method of modifying the interface of the substrate according to the embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

The present disclosure generally relates to waveguides for augmented, virtual, and mixed reality. More specifically embodiments described herein provide methods for modifying the interface of optical substrates. In one embodiment, a substrate is exposed to an ion beam then a high temperature bake or laser annealing to modify the interface layer. In another embodiment, a high energy ion beam is be used to remove the interface layer then a new interface layer is added during a high temperature bake process or laser annealing process. A protective layer deposited thereover.

Figure 1A:
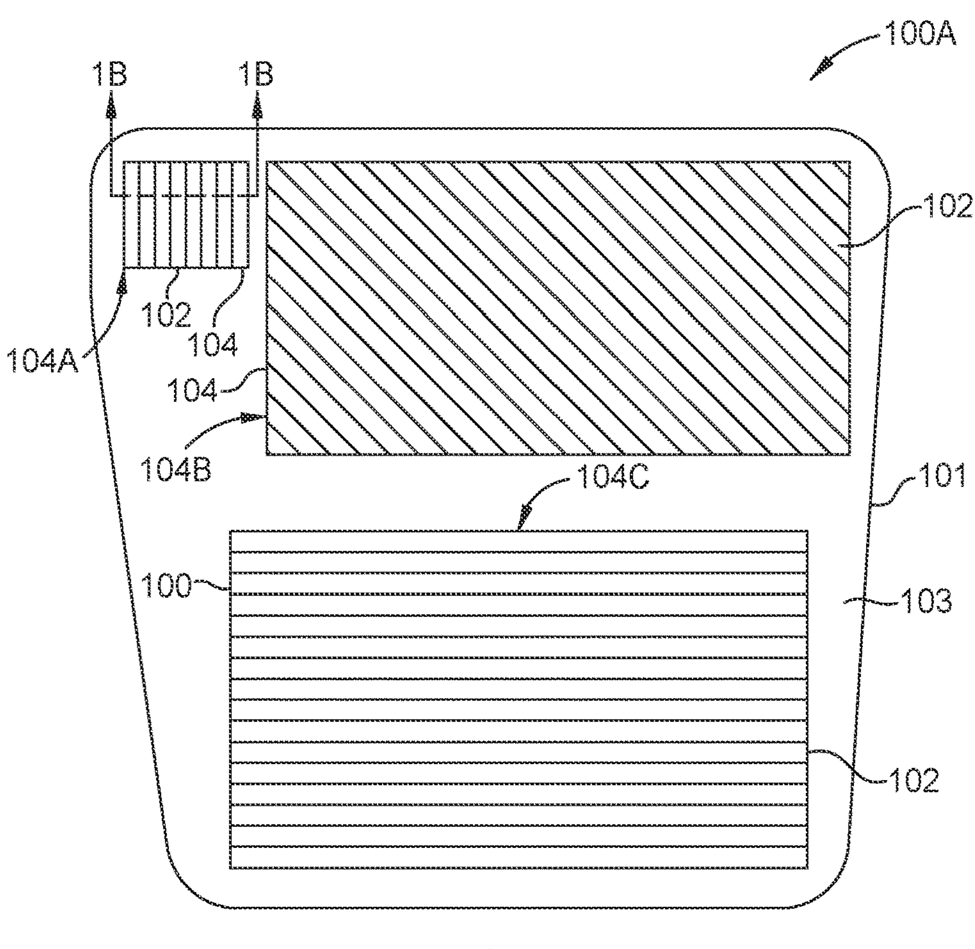
FIG. 1A is a schematic, top view of a waveguide combiner according to embodiments.

FIG. 1A is a schematic, top view of an optical device 100. The optical device 100 described below is to be understood as an exemplary optical device. In one embodiment, which can be combined with other embodiments described herein, the optical device 100 is a waveguide combiner, such as an augmented reality waveguide combiner. The optical device 100 include a plurality of optical device structures 102 disposed on a surface 103 of a substrate 101. The optical device structures 102 may be nanostructures having sub-micron dimensions, e.g., nano-sized dimensions. In one embodiment, which can be combined with other embodiments described herein, regions of the optical device structures 102 correspond to one or more gratings 104, such as a first grating 104*a*, a second grating 104*b*, and a third grating 104*c*. In another embodiment, which can combined with other embodiments described herein, the optical device 100 is a waveguide combiner that includes at least the first grating 104*a* corresponding to an input coupling grating and the third grating 104*c* corresponding to an output coupling grating. The waveguide combiner, according to the embodiment, which can be combined with other embodiments described herein, includes the second grating 104*b* corresponding to an intermediate grating.

The substrate 101 includes, but is limited to, silicon carbide (SiC) containing materials, lithium niobate ($LiNbO_3$) containing materials, diamond (C) containing materials, metal oxide containing materials, or combinations thereof.

Figure 1B:
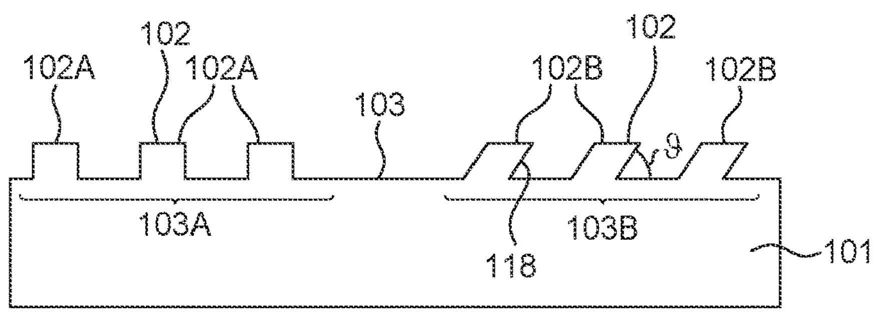
FIG. 1B is a schematic, cross-sectional view of a grating of a waveguide combiner according to embodiments.

FIG. 1B is a schematic cross-sectional view of a plurality of optical device structures 102. FIG. 1B is along the cut line 1B-1B of the optical device 100. In some embodiments, the optical device 100 includes the plurality of optical device structures 102 disposed on a surface 103 of a substrate 101. The optical device structures 102 may correspond to one or more gratings 104. In some embodiments, the plurality of optical device structures 102 may include first optical device structures 102A disposed across a first portion 103A of the surface 103 and second optical device structures 102B disposed across a second portion 103B of the surface 103. While FIG. 1B depicts the optical device structures 102 as having square or rectangular shaped cross-sections, the cross-sections of the optical device structures 102 may have other shapes including, but not limited to, circular, triangular, elliptical, regular polygonal, irregular polygonal, and/or irregular shaped cross-sections. In some embodiments, which can be combined with other embodiments described herein, the cross-sections of the plurality of optical device structures 102 have different shaped cross-sections. In other embodiments, which can be combined with other embodiments described herein, the cross-sections of the optical device structures 102 have cross-sections with substantially the same shape.

In some embodiments, the first optical device structures 102A may be substantially vertical, (i.e. binary). Sidewalls 118 of the first optical device are parallel to each other and perpendicular with the surface 103 of the substrate 101. The first optical device structures 102A are formed out of the substrate 101.

The second optical device structures 102B are angled a device angle θ relative to the substrate 101. The device angle θ is the angle between the surface 103 of the substrate 101 and the sidewalls 118 of the second optical device structure 102B. In one embodiment, which can be combined with other embodiments described herein, each respective device angle θ for each second optical device structure 1028 is substantially equal throughout the substrate 101. In another embodiment, which can be combined with other embodiments described herein, at least one respective device angle θ of the plurality of second optical device structures 102B is different than another device angle θ of the plurality of second optical device structures 102B. The second optical device structures 1028 are formed in the same way as the first optical device structures.

Figure 2:
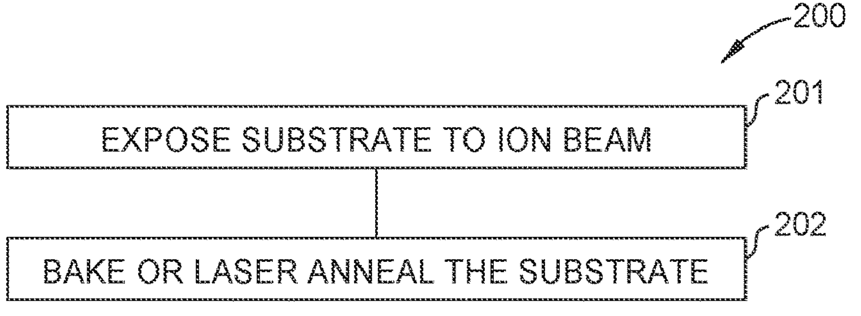
FIG. 2 is a flow diagram of a method for modifying the interface of the substrate according to embodiments.

FIG. 2 is a flow diagram of a method 200 for modifying the interface of the substrate according to embodiments as shown in FIGS. 3A-3D. FIGS. 3A-3D are schematic, cross-sectional views of the substrate 101 during the method 200. Prior to operation 201, as shown in FIG. 3A, the surface 103 of the substrate 101 has an interface layer 301 formed thereon. The first interface layer 301 has a thickness of 1 angstrom to 10 nm. In one embodiment, the substrate 101 has optical device structures 102 forming the grating 104 disposed in the interface layer 301. The interface layer 301 has surface defects that may result in light loss in the substrate 101. The surface defects can be introduced in fabrication. Surface defects include impurities, surface roughness, nano-scratches, or crystal dislocation. Crystal dislocation may be present when the substrate 101 is made of a crystalline material. Crystal dislocation can be caused by overhanging bonds putting atoms out of place in the crystal structure. These misplaced atoms can cause extra energy levels causing the substrate 101 to absorb more light increasing the light loss. Nano-scratching may be present when the substrate 101 is made of materials of the substrate 101 provided herein. Nano-scratches may be a 1 angstroms deep to 20 nm deep in the first interface layer 301.

At operation 201, as shown in FIG. 3B, the substrate 101 is exposed to an ion beam 302. The ion beam 302 may include argon, nitrogen, or oxygen containing chemistry. In one embodiment, as shown in FIG. 3B, the ion beam 302 may modify the crystal structure of the interface layer 301 and the substrate 101 to a depth 311. The modified crystal structure is then ready to be rebuilt. In another embodiment, as shown in FIG. 3C, the ion beam 302 may deposit dopant material in the interface layer 301 and in the substrate 101 to the depth 311. The dopant material includes at least one of boron, aluminum, gallium, oxygen, nitrogen, or phosphorus-containing materials. The dopants may remove the absorption bonds connecting the interface layer 301 and the substrate 101. The dopants break overhanging bonds between atoms in the overhanging bonds. The atoms are then bonded to other atoms forming new bonds. The new bonds have higher energy levels for example covalent bonds. The higher energy levels are high enough such that visible light cannot interact with the higher energy bonds, reducing the absorption of light.

At operation 202, the substrate 101 is subjected to a bake or an anneal process. The anneal process or bake process either recrystallizes the interface layer 301, removes impurities from the interface layer 301, or forms a second interface layer (not shown) on the surface 103, as shown in FIG. 3D. In one embodiment, the bake process is a high temperature bake. In another embodiment, the annealing process can be a laser anneal process. The second interface layer may have the same composition as the substrate 101.

FIG. 4 is a flow diagram of a method 400 for modifying the interface of the substrate according to embodiments as shown in FIGS. 5A-5D. FIGS. 5A-5D are schematic, cross-sectional views of the substrate 101 during the method 400. Prior to operation 401, as shown in FIG. 5A, the surface 103 of the substrate 101 has an interface layer 301 formed thereon. The first interface layer 301 has a thickness of 1 angstrom to 10 nanometers (nm). In one embodiment the substrate 101 has optical device structures 102 disposed on the surface 103. The interface layer 301 has surface defects that may result in light loss in the substrate 101. The surface defects can be introduced in fabrication. Surface defects include impurities, surface roughness, or crystal dislocation. At operation 401, the interface layer 301 is removed. The interface layer 301 may be removed by an etching process 502 as shown in FIG. 5B. In one embodiment a wet etch chemistry is used. The wet etch chemistry may include dilute hydrofluoric acid, (DHF). In another embodiment an ion beam is used. The ion beam may be a high energy ion beam.

At operation 402, a second interface layer 501 is formed. In one embodiment, the second interface layer 501 is regrown using an annealing process as shown in FIG. 5C. The second interface layer 501 has a thickness of 1 angstrom to 10 nm. In one embodiment, the second interface layer is formed by a bake process, such as a high temperature bake. In another embodiment, the annealing process can be a laser anneal process.

At operation 403, a protective layer 505 is deposited on a surface of the second interface layer 501. The protective layer 505 includes, but is not limited to, silicon oxide ($SiO_2$), titanium oxide ($TiO_2$), or silicon nitride ($Si_3N_4$). The protective layer 505 has a thickness of 1 angstrom to 10 nm, such as 1 angstrom to 5 nm.

In summation, methods for modifying the interface of optical substrates. To achieve desirable optical properties, surface defects need to be removed from the interface layer 301. In one example, a substrate is exposed to an ion beam then a high temperature bake or laser annealing to correct the interface layer. In another example, a high energy ion beam can be used to remove the interface layer then a new interface layer can be added during a high temperature bake or laser annealing with a protective layer added last. If not removed surface defects in the interface layer 301 may absorb a percentage of light in a single interaction. In a waveguide, light may bounce ten to hundreds of times inside a substrate causing significant light loss through absorption. Therefore, removing the surface defects significantly increases waveguide efficiency.

While the foregoing is directed to embodiments of the present disclosure, other and further embodiments of the disclosure may be devised without departing from the basic scope thereof, and the scope thereof is determined by the claims that follow.

What is claimed is:

1. A method of fabricating a waveguide, comprising:

exposing a first interface layer of an optical device substrate to an ion beam, the first interface layer having a crystalline structure and exposing the first interface layer to the ion beam modifies the crystalline structure of the first interface layer, the optical device substrate comprising silicon carbide (SiC) containing materials, lithium niobate ($LiNbO_3$) containing materials, diamond (C) containing materials, metal oxide containing materials, or combinations thereof, the first interface layer is disposed on a first surface of the optical device substrate; and subjecting the optical device substrate to a bake process or an anneal process, wherein the bake process or the anneal process recrystallizes the first interface layer, removes impurities from the first interface layer, or forms a second interface layer on the first surface of the optical device substrate.

2. The method of claim 1, wherein the ion beam includes an argon, a nitrogen, or an oxygen containing chemistry.

3. The method of claim 1, wherein the bake process is a high temperature bake.

4. The method of claim 1, wherein the anneal process is a laser anneal process.

5. The method of claim 1, wherein the first surface of the optical device substrate includes a plurality of optical device structures.

6. The method of claim 5, wherein the optical device structures have sidewalls parallel to each other and angled relative to the first surface of the optical device substrate, the optical device structures are disposed in the first interface layer.

7. The method of claim 1, wherein exposing the first interface layer the ion beam deposits dopants in the first interface layer to remove absorption bonds.

8. A method of fabricating a waveguide, comprising:

removing a first interface layer of an optical device substrate, the optical device substrate comprising silicon carbide (SiC) containing materials, lithium niobate ($LiNbO_3$) containing materials, diamond (C) containing materials, metal oxide containing materials, or combinations thereof, the first interface layer is disposed on a first surface of the optical device substrate;

forming a second interface layer using a bake process or an anneal process; and depositing a protective layer on the second interface layer.

9. The method of claim 8, wherein the first interface layer is removed by a wet etching process.

10. The method of claim 8, wherein the first interface layer is removed by an ion beam.

11. The method of claim 8, wherein the protective layer comprises silicon oxide ($SiO_2$) or silicon nitride ($Si_3N_4$).

12. The method of claim 8, wherein the first surface of the optical device substrate includes a plurality of optical device structures.

13. The method of claim 12, wherein the optical device structures have sidewalls parallel to each other and perpendicular to the first surface of the optical device substrate, the optical device structures are disposed in the first interface layer.

14. The method of claim 8, wherein the bake process is a high temperature bake.

15. The method of claim 8, wherein the anneal process is a laser anneal process.

16. A waveguide, comprising:

an optical device substrate having a substrate material, the substrate material comprising silicon carbide (SiC) containing materials, lithium niobate ($LiNbO_3$) containing materials, diamond (C) containing materials, metal oxide containing materials, or combinations thereof;

an interface layer disposed on the optical device substrate, the interface layer comprising the substrate material and a dopant material; and at least one grating having optical device structures disposed in the interface layer.

17. The waveguide of claim 16, further comprising a protective layer disposed on the interface layer.

18. The waveguide of claim 17, wherein the protective layer comprises silicon oxide ($SiO_2$), titanium oxide ($TiO_2$), or silicon nitride ($Si_3N_4$).

19. The waveguide of claim 16, wherein the dopant material contains at least one of boron, aluminum, gallium, oxygen, nitrogen, or phosphorus-containing materials.

* * * * *